US012759364B2

(12) United States Patent
Fu et al.

(10) Patent No.: US 12,759,364 B2

(45) Date of Patent: Oct. 13, 2026

(54) ACTIVE SUSPENSION CONTROL METHOD UNDER VEHICLE-MOUNTED VISUAL PERCEPTION

(71) Applicant: Zhengzhou University of Light Industry, Zhengzhou (CN)

(72) Inventors: Zhijun Fu, Zhengzhou (CN); Xiang Zhang, Zhengzhou (CN); Minghui Cui, Zhengzhou (CN); Dengfeng Zhao, Zhengzhou (CN); Yuanwei Li, Zhengzhou (CN); Sheng Li, Zhengzhou (CN); Qu Zhao, Zhengzhou (CN); Zhigang Zhang, Zhengzhou (CN); Yaohua Guo, Zhengzhou (CN); Jinquan Ding, Zhengzhou (CN); Wenbin He, Zhengzhou (CN); Junjian Hou, Zhengzhou (CN); Changjun Wu, Zhengzhou (CN); Fang Zhou, Zhengzhou (CN); Feng Zhao, Zhengzhou (CN)

(73) Assignee: Zhengzhou University of Light Industry, Zhengzhou (CN)

( * ) Notice: Subject to any disclaimer, the term of this patent is extended or adjusted under 35 U.S.C. 154(b) by 0 days.

(21) Appl. No.: 19/097,914

(22) Filed: Apr. 2, 2025

(65) Prior Publication Data

US 2025/0303809 A1 Oct. 2, 2025

(30) Foreign Application Priority Data

Apr. 2, 2024 (CN) ......................... 202410389771.8

(51) Int. Cl.
*B60G 17/0165* (2006.01)

(52) U.S. Cl.
CPC .... *B60G 17/0165* (2013.01); *B60G 2400/821* (2013.01); *B60G 2401/142* (2013.01);
(Continued)

(58) Field of Classification Search
CPC .......... B60G 17/0165; B60G 2400/821; B60G 2401/142; B60G 2600/09;
(Continued)

(56) References Cited

U.S. PATENT DOCUMENTS

2021/0406523 A1* 12/2021 Zhao .................... G06V 10/143
2023/0019390 A1* 1/2023 Wei .................... B60G 17/0165
(Continued)

*Primary Examiner* — Yi-Kai Wang

(57) ABSTRACT

The present disclosure discloses an active suspension control method under vehicle-mounted visual perception preview. It uses a binocular camera combined with multiple visual perception algorithms, and monitors in real time the road surface conditions ahead of the vehicle. By accurately capturing and analyzing the road surface information, based on robust control theory and Lyapunov theory, it designs a matching preview $H_\infty$ controller. The vehicle can effectively reduce bumps and vibrations by timely adjusting the suspension system, providing passengers with a more stable and smooth driving experience. The present disclosure uses a machine vision method to sense in advance the road surface information ahead, improving the time lag problem in the traditional suspension control method, thereby significantly improving the vehicle safety and ride comfort.

3 Claims, 2 Drawing Sheets

(52) U.S. Cl.
CPC .... *B60G 2600/09* (2013.01); *B60G 2600/182* (2013.01); *B60G 2600/90* (2013.01)

(58) Field of Classification Search
CPC .......... B60G 2600/182; B60G 2600/90; B60G 17/0182; B60G 17/018; G06V 10/44; G06V 10/774; G06V 10/82; G06V 20/56; G06V 20/70
USPC ............................................................ 701/37
See application file for complete search history.

(56) References Cited

U.S. PATENT DOCUMENTS

2023/0368354 A1* 11/2023 Yang ..................... G06T 7/0004
2023/0386211 A1* 11/2023 Zhang .................... G06V 20/50

* cited by examiner

ACTIVE SUSPENSION CONTROL METHOD UNDER VEHICLE-MOUNTED VISUAL PERCEPTION

CROSS-REFERENCE TO RELATED APPLICATIONS

The present application claims priority of Chinese Patent Application No. 202410389771.8, filed on Apr. 2, 2024, the entire contents of which are hereby incorporated by reference.

TECHNICAL FIELD

The present disclosure relates to the field of machine vision and vehicle suspension control technology, and more particularly to an active suspension control method under vehicle-mounted visual perception preview.

BACKGROUND

With the development of intelligent driving technology, people's demand for vehicle safety and comfort is constantly increasing. The suspension system has a great impact on the performance of vehicle safety and comfort. At present, the active suspension has the best control effect. A good control method can maximize the performance of the suspension. However, traditional active suspension control technology often uses signal sensors on the vehicle body to collect road surface information. Due to the high-speed movement of the vehicle, the road excitation is constantly changing, so there is a time lag between the suspension system controller and the actuator, which hinders further improvement of the suspension performance.

SUMMARY

In view of the above-mentioned defects, the present disclosure provides an active suspension control method under vehicle-mounted visual perception preview, which uses a binocular camera and cooperates with a visual perception algorithm to collect road surface information in real time, and cooperates with the provided preview $H_\infty$ control method. It can effectively improve the time lag between the suspension system controller and the actuator, and improve the vehicle safety and comfort.

An active suspension control method under vehicle-mounted visual perception preview is provided, including specific steps as follows:

S1: training a target identification model: using a YOLOV5 target detection algorithm to identify the instantaneous road excitation of the speed bump;

S2: obtaining road surface information: using a binocular camera and combining with the target identification model that has been trained in S1, performing contour fitting on the identified target, obtaining the actual height $x_f$ of the target through the internal and external parameters of the camera, and calculating the actual distance S of the target with the binocular ranging algorithm;

S3: designing a controller;

Using the excitation information detected in S2, a preview $H_\infty$ controller based on state feedback is designed.

Further, step S1 is specifically as follows:

Different speed bump images are taken under different lighting conditions, and are annotated and produced as a data set using LabelImg; and the YOLOV5 target identification algorithm is used for training;

Further, step S2 is specifically as follows:

A binocular camera is installed in front of the vehicle, and the YOLOV5 model trained in S1 is used for target identification to determine whether there is a speed bump ahead;

When yes, the target is extracted, and the edge of the speed bump is detected using the Canny edge detection algorithm, and the contour of the object is extracted using the findContours function in OpenCV. The scale of the fitting object contour in the image is converted into the scale in the real world to obtain the actual height $x_f$ of the target;

The SIFT image processing algorithm is then used to detect feature points on the road surface image, and the corresponding feature point pairs in the image are obtained by the RANSAC matching algorithm. The parallax value $x_h - x_t$ of the image is calculated according to the found feature point pairs, and the actual distance S can be obtained according to the triangle similarity principle, as shown in FIG. 2, as follows:

$$\frac{L-(x_h-x_t)}{L}=\frac{S-f}{S} \tag{1}$$

$$S=\frac{fL}{x_h-x_t} \tag{2}$$

Wherein L is the center distance between the left and right cameras of the binocular camera, and f is the focal length of the camera.

Further, step S3 is specifically as follows:

First, establishing a ¼ suspension model.

$$\begin{cases} m_s\ddot{x}_1 = F - c_s(\dot{x}_1-\dot{x}_2) - k_s(x_1-x_2) \\ m_s\ddot{x}_2 = c_s(\dot{x}_1-\dot{x}_2) + k_s(x_1-x_2) - k_t(x_2-x_r) - F \end{cases} \tag{3}$$

Wherein, $m_s$ is the suspended mass, $m_t$ is the non-suspended mass, $x_1$ is the vertical displacement of the suspended mass, $x_2$ is the vertical displacement of the non-suspended mass, $x_r$ is the height of the road surface under the wheel, $k_s$ is the suspension spring stiffness, $k_t$ is the tire stiffness, $c_s$ is the suspension damping, and F is the active suspension control force.

According to equation (3), the active suspension model is established. The state variable is taken $X=[x_1-x_2\ \dot{x}_1\ x_2-x_r\ \dot{x}_2]^T$. The output is $Y=[x_1-x_2\ x_2-x_r\ F\ \ddot{x}_1]^T$. The state equation is expressed as follows $$\begin{cases} \dot{X} = AX + B_1\dot{x}_r + B_2F \\ Y = C_1X + D_{11}\dot{x}_r + D_{12}F \\ Z = C_2X \end{cases} \tag{4}$$

$$\text{Wherein, } A=\begin{bmatrix} 0 & 1 & 0 & -1 \\ -\frac{k_s}{m_s} & -\frac{c_s}{m_s} & 0 & \frac{c_s}{m_s} \\ 0 & 0 & 0 & 1 \\ \frac{k_s}{m_t} & \frac{c_s}{m_t} & -\frac{k_t}{m_t} & -\frac{c_s}{m_t} \end{bmatrix},\ B_1=[0\ \ 0\ \ -1\ \ 0]^T,$$

$$B_2=\left[0\ \ \frac{1}{m_s}\ \ 0\ \ -\frac{1}{m_t}\right]^T,\ C_1=\begin{bmatrix} 1 & 0 & 0 & 0 \\ 0 & 0 & 1 & 0 \\ 0 & 0 & 0 & 0 \\ -\frac{k_s}{m_s} & -\frac{c_s}{m_s} & 0 & \frac{c_s}{m_s} \end{bmatrix},$$

-continued $$D_{11} = [0 \quad 0 \quad 0 \quad 0]^T,\ D_{12} = \left[0 \quad 0 \quad 1 \quad \frac{1}{m_s}\right]^T,$$

$$C_2 = \begin{bmatrix} 1 & 0 & 0 & 0 \\ 0 & 1 & 0 & 0 \\ 0 & 0 & 1 & 0 \\ 0 & 0 & 0 & 1 \end{bmatrix},\ Z = [x_1 - x_2 \quad \dot{x}_1 \quad x_2 - x_r \quad \dot{x}_2]^T$$

are status feedback.

The relationship between the actual road surface excitation $x_r$ and the preview excitation $x_f$ is as follows:

$$\frac{z_r}{z_f} = e^{-ts} \tag{5}$$

Wherein $$t = \frac{S}{v}$$

is the preview time, and v is the vehicle speed.

Adopting pade to approach quadratic approximation $$\frac{z_r}{z_f} = \frac{s^2 - \varphi_1 s + \varphi_0}{s^2 + \varphi_1 s + \varphi_0} \tag{6}$$

$$\text{Wherein } \varphi_1 = \frac{6}{t},\ \varphi_2 = \frac{12}{t^2}$$

Performing Laplace inverse transformation on it to obtain:

$$\ddot{y} + \varphi_1 \dot{y} + \varphi_0 y = \theta \dot{x}_f \tag{7}$$

$$\text{Wherein } y = \dot{x}_r - \dot{x}_f,\ \theta = -2\varphi_1$$

Defining the additional state vector $\eta = [\eta_1 \quad \eta_2]^T$, $\eta_1 = y$, $\eta_2 = \dot{\eta}_1 - \theta \square \dot{x}_f$. Its state space equation is $$\begin{cases} \dot{\eta} = A_9 \eta + B_9 \dot{x}_f \\ \dot{x}_r = C_9 \eta + D_9 \dot{x}_f \end{cases} \tag{8}$$

$$\text{Wherein } A_9 = \begin{bmatrix} 0 & 1 \\ -\varphi_0 & -\varphi_1 \end{bmatrix},\ B_9 = \begin{bmatrix} -2\varphi_1 \\ 2\varphi_1^2 \end{bmatrix},\ C_9 = [1 \quad 0],\ D_9 = 1.$$

Combined with equation (4), the active suspension state equation containing preview information can be obtained, as shown in equation $$\begin{cases} \dot{X}_\eta = A_\eta X_\eta + B_{1\eta} \dot{x}_f + B_{2\eta} F \\ Y_\eta = C_{1\eta} X_\eta + D_{11\eta} \dot{x}_f + D_{12\eta} F \\ Z_\eta = C_{2\eta} X_\eta \end{cases} \tag{9}$$

$$\text{Wherein } \dot{X}_\eta = \begin{bmatrix} \dot{X} \\ \dot{\eta} \end{bmatrix},\ Y_\eta = \begin{bmatrix} Y \\ \dot{\eta} \end{bmatrix},\ Z_\eta = \begin{bmatrix} Z \\ \dot{\eta} \end{bmatrix},\ X_\eta = \begin{bmatrix} X \\ \dot{\eta} \end{bmatrix},$$

$$A_\eta = \begin{bmatrix} A & B_1 \square C_9 \\ 0 & A_9 \end{bmatrix},\ B_{1\eta} = \begin{bmatrix} B_1 \square D_9 \\ B_9 \end{bmatrix},\ B_{2\eta} = \begin{bmatrix} B_2 \\ 0 \end{bmatrix},$$

-continued $$C_{1\eta} = \begin{bmatrix} C_1 & D_{11} \square C_9 \\ 0 & A_9 \end{bmatrix},\ D_{11\eta} = \begin{bmatrix} D_{11} \square D_9 \\ B_9 \end{bmatrix},\ D_{12\eta} = \begin{bmatrix} D_{12} \\ 0 \end{bmatrix},$$

$$C_{2\eta} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}.$$

Next, the LMI-based suspension $H_\infty$ controller is designed. The transfer function G from the external excitation to the output should satisfy the following relationship:

$$\|G\| \le \gamma \tag{10}$$

Wherein $\gamma$ is a specified positive scalar.

Assuming that the state feedback gain is K, and substituting $F = KX_\eta$ into equation (9) to obtain:

$$\begin{cases} \dot{X}_\eta = A_c X_\eta + B_{1\eta} \dot{x}_f \\ Y_\eta = C_l X_\eta + D_{11\eta} \dot{x}_f \\ Z_\eta = C_{2\eta} X_\eta \end{cases} \tag{11}$$

$$\text{Wherein } A_c = A_\eta + B_{2\eta} \square K,\ C_l = C_{1\eta} + D_{12\eta} \square K.$$

Theorem: For a given positive scalar $\gamma$, if there exists a positive definite matrix $P_0$ and a matrix Q, the following LMI can be established:

$$\begin{bmatrix} P_0 A_\eta + Q^T B_{2\eta} + A_\eta P_0 + B_{2\eta} Q & P_0 C_{2\eta}^T & B_{2\eta} \\ C_{2\eta} P_0 & -I & 0 \\ B_{2\eta}^T & 0 & -\gamma^2 I \end{bmatrix} < 0 \tag{12}$$

Then a closed-loop control system has the following $H_\infty$ performance:

$$\int_0^T Z^T(t) Z(t) dt < \lambda_{max}(P) \|X(0)\|^2 + \gamma^2 \int_0^T z_f^T(t) z_f(t) dt \tag{13}$$

$$\text{Where } Q = KP_0,\ P_0 = P^{-1}.$$

Setting the Lyapunov function as $$V = X_\eta^T P X_\eta \tag{14}$$

Taking the derivative of this, it gives:

$$\dot{V} = X_\eta^T (A_c^T P + P A_c) X_\eta + x_f^T B_{2\eta}^T P X_\eta + X_\eta^T P B_{2\eta} z_f \tag{15}$$

In order to ensure the performance of the $H_\infty$ controller, the evaluation index $J_1$ is introduced:

$$J_1 = \dot{V} + Z_\eta^T Z_\eta - \gamma^2 z_f^2 \tag{16}$$

-continued $$= [X_\eta \;\; z_f]\begin{bmatrix} A_c^T P + PA_c + C_{2\eta}^T C_{2\eta} & PB_{2\eta} \\ B_{2\eta}^T & -\gamma^2 I \end{bmatrix}\begin{bmatrix} X_\eta \\ z_f \end{bmatrix}$$

According to Schur's complement theorem, the evaluation index $J_1$ can be equivalent to $J_2$, $$\begin{bmatrix} P^{-1} & 0 \\ 0 & I \end{bmatrix}\begin{bmatrix} A_c^T P + PA_c + C_{2\eta}^T C_{2\eta} & PB_{2\eta} \\ B_{2\eta}^T P & -\gamma^2 I \end{bmatrix}\begin{bmatrix} P^{-1} & 0 \\ 0 & I \end{bmatrix} \tag{17}$$

$$\text{That is } J_2 = \begin{bmatrix} p^{-1} A_c^T + A_c P^{-1} & B_{2\eta} & P^{-1} C_{2\eta}^T \\ B_{2\eta}^T & -\gamma^2 I & 0 \\ C_{2\eta} P^{-1} & 0 & -I \end{bmatrix} \tag{18}$$

Substituting $A_c=A_\eta+B_{2\eta}$⊐$K$ into equation (18) and performing elementary transformations, it gives:

$$J_2 = \begin{bmatrix} p_0 A_\eta^T + Q^T B_{2\eta}^T + A_\eta P_0 + B_{2\eta} Q & P^{-1} C_{2\eta}^T & B_{2\eta} \\ C_{2\eta} P^0 & -I & 0 \\ B_{2\eta}^T & 0 & -\gamma^2 I \end{bmatrix} \tag{19}$$

Given a positive scalar $\gamma$, if there exists a positive definite matrix $P_0$ and a matrix Q such that $J_2<0$, then $J_1<0$ holds. By integrating $J_1$, it gives:

$$\int_0^T J_1 dt = \int_0^T \left(\dot{V} + Z_\eta^T Z_\eta - \gamma^2 z_f^2\right) dt < 0 \tag{20}$$

According to Lyapunov's definition of stability, it gives:

$$\int_0^T \dot{V} dt = V(T) - V(0) < 0 \tag{21}$$

Substituting the Lyapunov function into equation (21), it gives:

$$\int_0^T \dot{V} dt = X_\eta^T(T) P X_\eta(T) - X_\eta^T(0) P X_\eta(0) < 0 \tag{22}$$

Due to $$X_\eta^T(T) P X_\eta(T) > 0,\; P < -\lambda_{max}(P) I,$$

the following is obtained:

$$\int_0^T \dot{V} dt > -\lambda_{max}(P) \|X_\eta(0)\|^2 \tag{23}$$

Then equation (20) can be equivalent to $$\int_0^T Z^T(t) Z(t) dt < \lambda_{max}(P) \|X(0)\|^2 + \gamma^2 \int_0^T z_f^T(t) z_f(t) dt \tag{24}$$

Given a positive scalar $\gamma$, solving for the positive definite matrix $P_0$ and the matrix Q, the closed-loop system obtains a control gain of K=QP, then the closed-loop system has $H_\infty$ performance.

Using the LMI solver in MATLAB to solve the state feedback gain as K, and find the optimal control force. The designed preview $H_\infty$ controller is used to improve the suspension dynamic route, the tire dynamic displacement and the vehicle body acceleration, so that the vehicle comfort and safety are improved.

Compared with the prior art, the present disclosure has the following technical effects:

The active suspension control method under vehicle-mounted visual perception preview described in the present disclosure uses a binocular camera to adopt the YOLOV5 target detection algorithm and combines with multiple visual perception algorithms such as the Canny edge detection algorithm. Road surface information is obtained and analyzed in real time and in all directions, thereby improving the identification accuracy. Compared with the traditional suspension control method, the preview $H_\infty$ controller designed based on the robust control theory and the Lyapunov theory has a better control effect. Combining with the above-mentioned vehicle-mounted visual perception system, it effectively improves the time lag problem, thereby greatly improving the vehicle safety and ride comfort.

DESCRIPTION OF EMBODIMENTS

Figure 1:
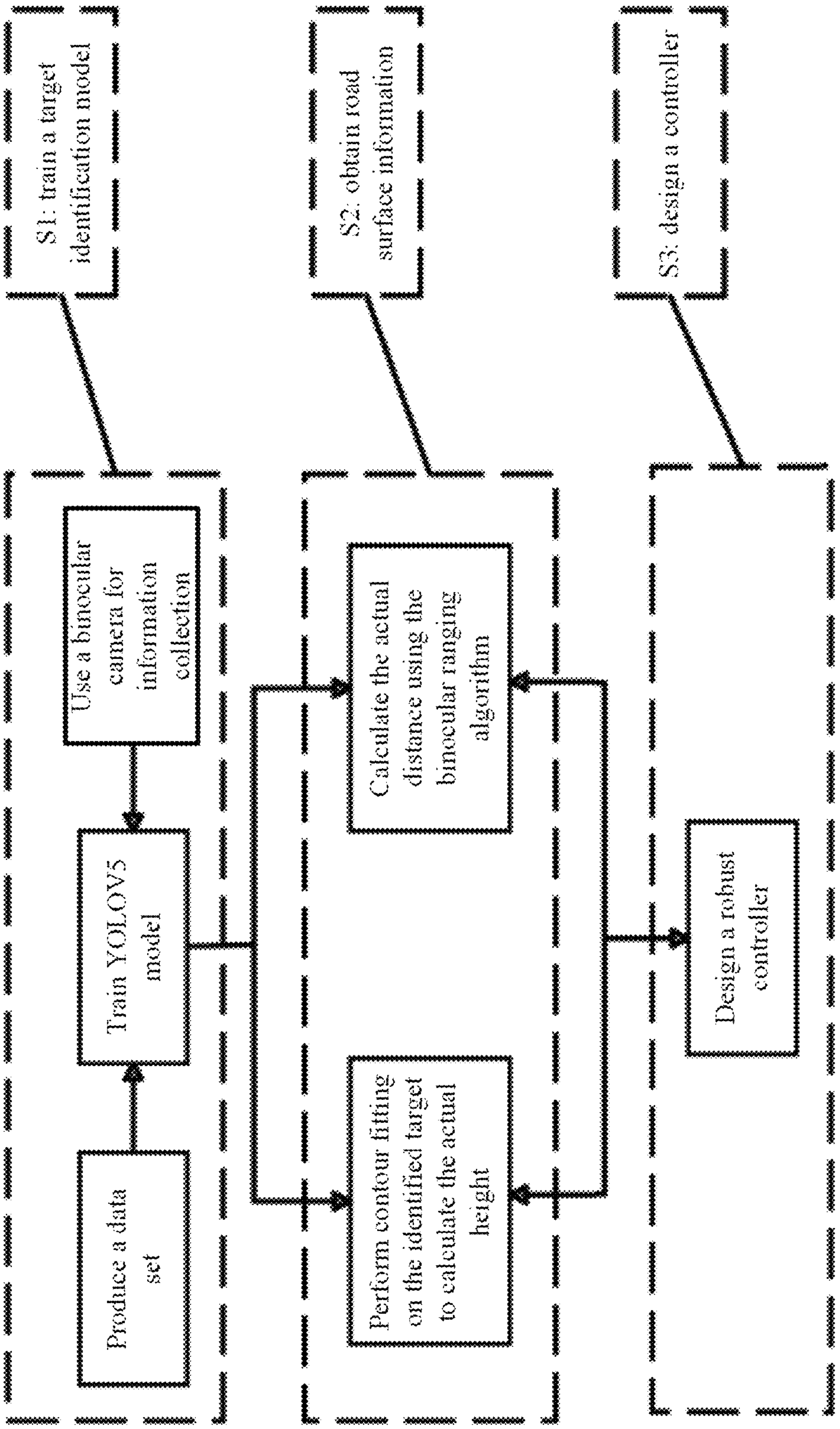
FIG. 1 is a flowchart of an implementation process of the present disclosure.

As shown in FIG. 1, an active suspension control method under vehicle-mounted visual perception preview is provided, it includes the steps as follows:

S1: training a target identification model: Use a YOLOV5 target detection algorithm to identify the instantaneous road surface excitation of speed bumps;

Step S1 is specifically as follows:

Taking different speed bump images under different lighting conditions, annotating them using LabelImg and producing a data set; and using YOLOV5 target identification algorithm for training;

S2: Obtaining road surface information: Use a binocular camera and combine with the target identification model trained in S1 to perform contour fitting on the identified target, obtain the actual height $x_f$ of the target through the internal and external parameters of the camera, and calculate the actual distance S of the target with the binocular ranging algorithm;

Step S2 is specifically as follows:

Installing the binocular camera in front of the vehicle, and using the YOLOV5 model trained in S1 to perform target identification and determine if there is a speed bump ahead.

Figure 2:
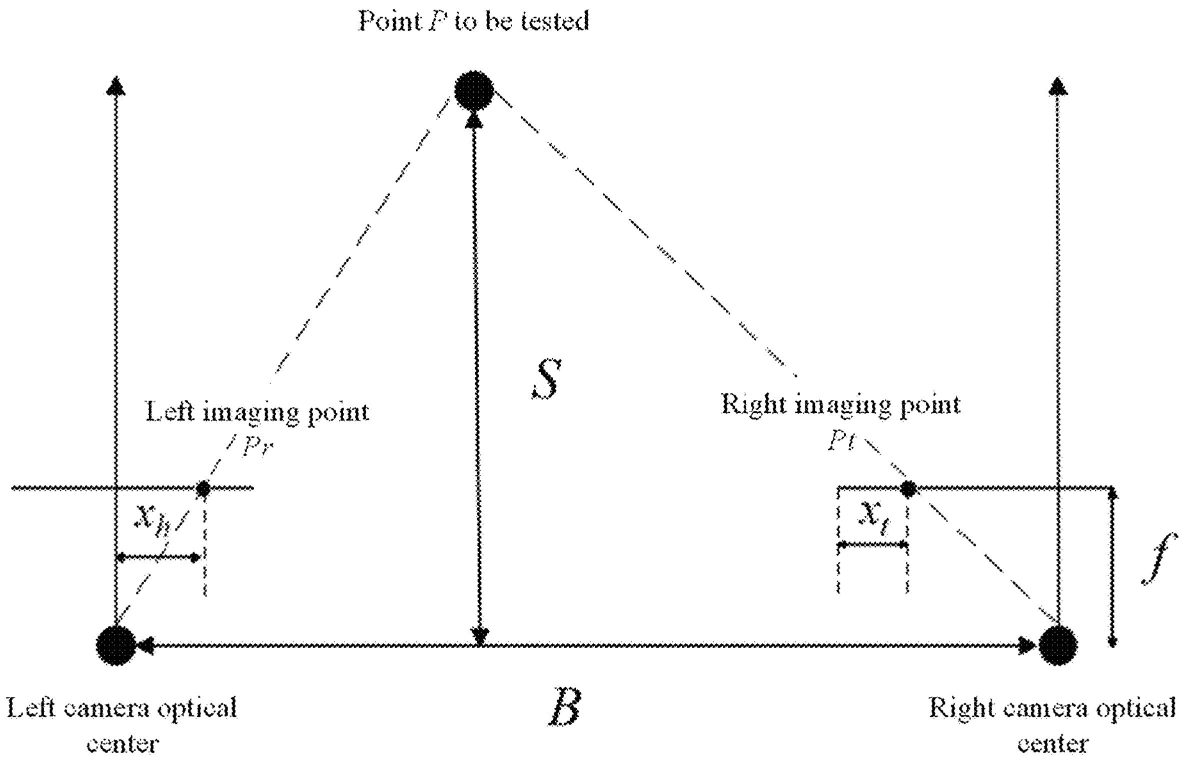
FIG. 2 is a schematic diagram of a binocular ranging principle provided by the present disclosure.

If so, extracting the target and using the Canny edge detection algorithm to detect the edge of the speed bump. Meanwhile, the findContours function in OpenCV is used to extract the contour of the object, and the scale of the fitting object contour in the image is converted to the scale in the real world to obtain the actual height $x_f$ of the target;

The SIFT image processing algorithm is then used to detect feature points on the road surface image, and the corresponding feature point pairs in the image are obtained by the RANSAC matching algorithm. The parallax value $x_h-x_t$ of the image is calculated based on the found feature point pairs, and the actual distance S can be obtained based on the triangle similarity principle, as shown in FIG. 2, as follows:

$$\frac{L-(x_h-x_t)}{L}=\frac{S-f}{S} \tag{1}$$

$$S=\frac{fL}{x_h-x_t} \tag{2}$$

Wherein L is the center distance between the left and right cameras of the binocular camera, and f is the focal length of the camera.

S3: Designing a controller;

Using the excitation information detected in S2, a preview $H_\infty$ controller based on the state feedback is designed;

Step S3 is specifically as follows:

First, establishing a ¼ suspension model.

$$\begin{cases} m_s\ddot{x}_1=F-c_s(\dot{x}_1-\dot{x}_2)-k_s(x_1-x_2) \\ m_t\ddot{x}_2=c_s(\dot{x}_1-\dot{x}_2)+k_s(x_1-x_2)-k_t(x_2-x_r)-F \end{cases} \tag{3}$$

Wherein, $m_s$ is the suspended mass, $m_t$ is the non-suspended mass, $x_1$ is the vertical displacement of the suspended mass, $x_2$ is the vertical displacement of the non-suspended mass, $x_r$ is the height of the road surface under the wheel, $k_s$ is the suspension spring stiffness, $k_t$ is the tire stiffness, $c_s$ is the suspension damping, and F is the active suspension control force.

According to equation (3), the active suspension model is established, and the state variable is taken as $X=[x_1-x_2\ \dot{x}_1\ x_2-x_r\ \dot{x}_2]^T$. The output is $Y=[x_1-x_2\ x_2-x_r\ F\ \ddot{x}_1]^T$. The state equation is expressed as follows $$\begin{cases} \dot{X}=AX+B_1\dot{x}_r+B_2F \\ Y=C_1X+D_{11}\dot{x}_r+D_{12}F \\ Z=C_2X \end{cases} \tag{4}$$

$$\text{Wherein, } A=\begin{bmatrix} 0 & 1 & 0 & -1 \\ -\frac{k_s}{m_s} & -\frac{c_s}{m_s} & 0 & \frac{c_s}{m_s} \\ 0 & 0 & 0 & 1 \\ \frac{k_s}{m_t} & \frac{c_s}{m_t} & -\frac{k_t}{m_t} & -\frac{c_s}{m_t} \end{bmatrix},\ B_1=[0\ \ 0\ \ -1\ \ 0]^T$$

$$B_2=\left[0\ \ \frac{1}{m_s}\ \ 0\ \ -\frac{1}{m_t}\right]^T,\ C_1=\begin{bmatrix} 1 & 0 & 0 & 0 \\ 0 & 0 & 1 & 0 \\ 0 & 0 & 0 & 0 \\ -\frac{k_s}{m_s} & -\frac{c_s}{m_s} & 0 & \frac{c_s}{m_s} \end{bmatrix},$$

$$D_{11}=[0\ \ 0\ \ 0\ \ 0]^T,\ D_{12}=\left[0\ \ 0\ \ 1\ \ \frac{1}{m_s}\right]^T,$$

$$C_2=\begin{bmatrix} 1 & 0 & 0 & 0 \\ 0 & 1 & 0 & 0 \\ 0 & 0 & 1 & 0 \\ 0 & 0 & 0 & 1 \end{bmatrix},\ Z=[x_1-x_2\ \ \dot{x}_1\ \ x_2-x_r\ \ \dot{x}_2]^T$$

are status feedback.

The relationship between the actual road surface excitation $x_r$ and the preview excitation $x_f$ is as follows:

$$\frac{z_r}{z_f}=e^{-ts} \tag{5}$$

Wherein $$t=\frac{S}{v}$$

is the preview time, and v is the vehicle speed.

Adopting pade to approach quadratic approximation $$\frac{\dot{z}_r}{\dot{z}_f}=\frac{s^2-\varphi_1 s+\varphi_0}{s^2+\varphi_1 s+\varphi_0} \tag{6}$$

$$\text{Wherein } \varphi_1=\frac{6}{t},\ \varphi_2=\frac{12}{t^2}$$

Performing the Laplace inverse transformation on it to obtain $$\ddot{y}+\varphi_1\dot{y}+\varphi_0 y=\theta\dot{x}_f \tag{7}$$

$$\text{Wherein } y=\dot{x}_r-\dot{x}_f,\ \theta=-2\varphi_1.$$

Defining the additional state vector $\eta=[\eta_1\ \eta_2]^T$, $\eta_1=y$, $\eta_2=\dot{\eta}_1-\theta□\dot{x}_f$. Its state space equation is $$\begin{cases} \dot{\eta}=A_9\eta+B_9\dot{x}_f \\ \dot{x}_r=C_9\eta+D_9\dot{x}_f \end{cases} \tag{8}$$

$$\text{Wherein } A_9=\begin{bmatrix} 0 & 1 \\ -\varphi_0 & -\varphi_1 \end{bmatrix},\ B_9=\begin{bmatrix} -2\varphi_1 \\ 2\varphi_1^2 \end{bmatrix},\ C_9=[1\ \ 0],\ D_9=1.$$

Combined with equation (4), the active suspension state equation containing preview information can be obtained, as shown in equation $$\begin{cases} \dot{X}_\eta=A_\eta X_\eta+B_{1\eta}\dot{x}_f+B_{2\eta}F \\ Y_\eta=C_{1\eta}X_\eta+D_{11\eta}\dot{x}_f+D_{12\eta}F \\ Z_\eta=C_{2\eta}X_\eta \end{cases} \tag{9}$$

$$\text{Wherein } \dot{X}_\eta=\begin{bmatrix} \dot{X} \\ \dot{\eta} \end{bmatrix},\ Y_\eta=\begin{bmatrix} Y \\ \dot{\eta} \end{bmatrix},\ Z_\eta=\begin{bmatrix} Z \\ \dot{\eta} \end{bmatrix},\ X_\eta=\begin{bmatrix} X \\ \dot{\eta} \end{bmatrix},\ A_\eta=\begin{bmatrix} A & B_1□C_9 \\ 0 & A_9 \end{bmatrix},$$

$$B_{1\eta}=\begin{bmatrix} B_1□D_9 \\ B_9 \end{bmatrix},\ B_{2\eta}=\begin{bmatrix} B_2 \\ 0 \end{bmatrix},\ C_{1\eta}=\begin{bmatrix} C_1 & D_{11}□C_9 \\ 0 & A_9 \end{bmatrix},\ D_{11\eta}=\begin{bmatrix} D_{11}□D_9 \\ B_9 \end{bmatrix},$$

$$D_{12\eta}=\begin{bmatrix} D_{12} \\ 0 \end{bmatrix},\ C_{2\eta}=\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}.$$

Next, the LMI-based suspension $H_\infty$ controller is designed. The transfer function G from the external excitation to the output should satisfy the following relationship:

$$\|G\|\le\gamma \tag{10}$$

Wherein $\gamma$ is a specified positive scalar.

Assuming that the state feedback gain is K, and substituting $F=KX_\eta$ into equation (9) to obtain:

$$\begin{cases} \dot{X}_\eta = A_c X_\eta + B_{1\eta}\dot{x}_f \\ Y_\eta = C_l X_\eta + D_{11\eta}\dot{x}_f \\ Z_\eta = C_{2\eta}X_\eta \end{cases} \tag{11}$$

Wherein $A_c = A_\eta + B_{2\eta}\square K$, $C_l = C_{1\eta} + D_{12\eta}\square K$.

Theorem: For a given positive scalar $\gamma$, if there exists a positive definite matrix $P_0$ and a matrix Q, the following LMI can be established:

$$\begin{bmatrix} P_0 A_\eta + Q^T B_{2\eta} + A_\eta P_0 + B_{2\eta} Q & P_0 C_{2\eta}^T & B_{2\eta} \\ C_{2\eta} P_0 & -I & 0 \\ B_{2\eta}^T & 0 & -\gamma^2 I \end{bmatrix} < 0 \tag{12}$$

Then the closed-loop control system has the following $H_\infty$ performance:

$$\int_0^T Z^T(t)Z(t)dt < \lambda_{max}(P)\|X(0)\|^2 + \gamma^2 \int_0^T z_f^T(t) z_f(t)dt \tag{13}$$

Wherein $Q = KP_0$, $P_0 = P^{-1}$.

Setting the Lyapunov function as $$V = X_\eta^T P X_\eta \tag{14}$$

Taking the derivative of this, it gives:

$$\dot{V} = X_\eta^T (A_c^T P + PA_c) X_\eta + x_f^T B_{2\eta}^T P X_\eta + X_\eta^T P B_{2\eta} z_f \tag{15}$$

In order to ensure the performance of the $H_\infty$ controller, the evaluation index $J_1$ is introduced:

$$J_1 = \dot{V} + Z_\eta^T Z_\eta - \gamma^2 z_f^2 = [X_\eta \;\; z_f] \begin{bmatrix} A_c^T P + PA_c + C_{2\eta}^T C_{2\eta} & PB_{2\eta} \\ B_{2\eta}^T P & -\gamma^2 I \end{bmatrix} \begin{bmatrix} X_\eta \\ z_f \end{bmatrix} \tag{16}$$

According to Schur's complement theorem, the evaluation index $J_1$ can be equivalent to $J_2$, $$\begin{bmatrix} P^{-1} & 0 \\ 0 & I \end{bmatrix} \begin{bmatrix} A_c^T P + PA_c + C_{2\eta}^T C_{2\eta} & PB_{2\eta} \\ B_{2\eta}^T P & -\gamma^2 I \end{bmatrix} \begin{bmatrix} P^{-1} & 0 \\ 0 & I \end{bmatrix} \tag{17}$$

$$\text{That is } J_2 = \begin{bmatrix} p^{-1} A_c^T + A_c P^{-1} & B_{2\eta} & P^{-1} C_{2\eta}^T \\ B_{2\eta}^T & -\gamma^2 I & 0 \\ C_{2\eta} P^{-1} & 0 & -I \end{bmatrix} \tag{18}$$

Substituting $A_c = A_\eta + B_{2\eta}\square K$ into equation (18) and performing elementary transformations, it gives:

$$J_2 = \begin{bmatrix} P_0 A_\eta^T + Q^T B_{2\eta}^T + A_\eta P_0 + B_{2\eta} Q & P^{-1} C_{2\eta}^T & B_{2\eta} \\ C_{2\eta} P_0 & -I & 0 \\ B_{2\eta}^T & 0 & -\gamma^2 I \end{bmatrix} \tag{19}$$

Given a positive scalar $\gamma$, if there exists a positive definite matrix $P_0$ and a matrix Q such that $J_2<0$, then $J_1<0$ holds. By integrating $J_1$, it gives:

$$\int_0^T J_1 dt = \int_0^T \left(\dot{V} + Z_\eta^T Z_\eta - r^2 z_f^2\right) dt < 0 \tag{20}$$

According to Lyapunov's definition of stability, it gives:

$$\int_0^T \dot{V} dt = V(T) - V(0) < 0 \tag{21}$$

Substituting the Lyapunov function into equation (21), it gives:

$$\int_0^T \dot{V} dt = X_\eta^T(T) P X_\eta(T) - X_\eta^T(0) P X_\eta(0) < 0 \tag{22}$$

Due to $$X_\eta^T(T) P X_\eta(T) > 0,\; P < -\lambda_{max}(P) I,$$

the following is obtained:

$$\int_0^T \dot{V} dt > -\lambda_{max}(P)\|X_\eta(0)\|^2 \tag{23}$$

Then equation (20) can be equivalent to $$\int_0^T Z^T(t)Z(t)dt < \lambda_{max}(P)\|X(0)\|^2 + \gamma^2 \int_0^T z_f^T(t) z_f(t)dt \tag{24}$$

Given a positive scalar $\gamma$, solving for the positive definite matrix $P_0$ and the matrix Q, the closed-loop system obtains a control gain of K=QP, then the closed-loop system has $H_\infty$ performance.

Using the LMI solver in MATLAB to solve the state feedback gain as K, and find the optimal control force. The designed preview $H_\infty$ controller is used to improve the suspension dynamic route, the tire dynamic displacement and the vehicle body acceleration, so that the vehicle comfort and safety are improved.

The invention claimed is:

1. An active suspension control method under vehicle-mounted visual perception preview, comprising steps of:

S1: training a target identification model: using a YOLOV5 target detection algorithm to identify an instantaneous road surface excitation of a speed bump;

S2: obtaining road surface information: using a binocular camera and combining with the target identification model that has been trained in S1, performing contour fitting on an identified target, obtaining an actual height $x_f$ of the target through internal and external parameters of the camera, and calculating an actual distance S of the target with a binocular ranging algorithm;

S3: designing a controller: using the excitation information detected in S2, designing a state feedback-based preview $H_\infty$ controller, wherein the step S2 comprises:

installing the binocular camera in front of the vehicle, and using the YOLOV5 model trained in S1 to perform target identification and determine when there is a speed bump ahead;

when there is the speed bump ahead, extracting the target and using the Canny edge detection algorithm to detect the edge of the speed bump, and using the findContours function in OpenCV to extract the contour of the object, and converting a scale of the fitting object contour in the image to a scale in a real world to obtain the actual height $x_f$ of the target;

detecting feature points on the road surface image by using a SIFT image processing algorithm, and obtaining corresponding feature point pairs in the image by a RANSAC matching algorithm; calculating a parallax value $x_h - x_t$ of the image based on the found feature point pairs, and obtaining the actual distance S based on a triangle similarity principle, as follows:

$$\frac{L-(x_h-x_t)}{L}=\frac{S-f}{S} \tag{1}$$

$$S=\frac{fL}{x_h-x_t} \tag{2}$$

wherein L is a center distance between left and right cameras of the binocular camera, and f is a focal length of the camera.

2. The active suspension control method according to claim 1, wherein the step S1 comprises:

taking different speed bump images under different lighting conditions, annotating the speed bump images using LabelImg and producing a data set; and using YOLOV5 target identification algorithm for training.

3. The active suspension control method according to claim 1, wherein the step S3 is comprises:

firstly establishing a ¼ suspension model $$\begin{cases} m_s\ddot{x}_1 = F - c_s(\dot{x}_1-\dot{x}_2) - k_s(x_1-x_2) \\ m_s\ddot{x}_2 = c_s(\dot{x}_1-\dot{x}_2) + k_s(x_1-x_2) - k_t(x_2-x_r) - F \end{cases} \tag{3}$$

wherein, $m_s$ is a suspended mass, $m_t$ is a non-suspended mass, $x_1$ is a vertical displacement of a suspended mass, $x_2$ is a vertical displacement of the non-suspended mass, $x_r$ is a height of the road surface under a wheel, $k_s$ is a suspension spring stiffness, $k_t$ is a tire stiffness, $c_s$ is a suspension damping, and F is an active suspension control force;

establishing an active suspension model according to the equation (3), taking a state variable $X=[x_1-x_2\ \dot{x}_1\ x_2-x_r\ \dot{x}_2]^T$, an output is $Y=[x_1-x_2\ x_2-x_r\ F\ \ddot{x}_1]^T$, a state equation is expressed as follow $$\begin{cases} \dot{X} = AX + B_1\dot{x}_r + B_2F \\ \dot{Y} = C_1X + D_{11}\dot{x}_r + D_{12}F \\ Z = C_2X \end{cases} \tag{4}$$

-continued $$\text{wherein, } A=\begin{bmatrix} 0 & 1 & 0 & -1 \\ -\frac{k_s}{m_s} & -\frac{c_s}{m_s} & 0 & \frac{c_s}{m_s} \\ 0 & 0 & 0 & 1 \\ \frac{k_s}{m_t} & \frac{c_s}{m_t} & -\frac{k_t}{m_t} & -\frac{c_s}{m_t} \end{bmatrix}, B_1=[0\ \ 0\ \ -1\ \ 0]^T,$$

$$B_2=\left[0\ \ \frac{1}{m_s}\ \ 0\ \ -\frac{1}{m_t}\right]^T, C_1=\begin{bmatrix} 1 & 0 & 0 & 0 \\ 0 & 0 & 1 & 0 \\ 0 & 0 & 0 & 0 \\ -\frac{k_s}{m_s} & -\frac{c_s}{m_s} & 0 & \frac{c_s}{m_s} \end{bmatrix},$$

$$D_{11}=[0\ \ 0\ \ 0\ \ 0]^T, D_{12}=\left[0\ \ 0\ \ 1\ \ \frac{1}{m_s}\right]^T,$$

$$C_2=\begin{bmatrix} 1 & 0 & 0 & 0 \\ 0 & 1 & 0 & 0 \\ 0 & 0 & 1 & 0 \\ 0 & 0 & 0 & 1 \end{bmatrix}, Z=[x_1-x_2\ \ \dot{x}_1\ \ x_2-x_r\ \ \dot{x}_2]^T$$

are status feedback;

a relationship between an actual road surface excitation $x_r$ and a preview excitation $x_f$ is as follow:

$$\frac{z_r}{z_f}=e^{-ts} \tag{5}$$

wherein $$t=\frac{S}{v}$$

is a preview time, and v is a vehicle speed;

adopting pade to approach quadratic approximation $$\frac{\dot{z}_r}{\dot{z}_f}=\frac{s^2-\varphi_1 s+\varphi_0}{s^2+\varphi_1 s+\varphi_0} \tag{6}$$

$$\text{wherein } \varphi_1=\frac{6}{t}, \varphi_2=\frac{12}{r^2}$$

performing Laplace inverse transformation on it to obtain:

$$\ddot{y}+\varphi_1\dot{y}+\varphi_0 y=\theta\dot{x}_f \tag{7}$$

$$\text{wherein } y=\dot{x}_r-\dot{x}_f, \theta=-2\varphi_1$$

defining an additional state vector $\eta=[\eta_1\ \ \eta_2]^T$, $\eta_1=y$, $\eta_2=\eta_1-\theta\dot{x}_f$, its state space equation is $$\begin{cases} \dot{\eta} = A_9\eta + B_9\dot{x}_f \\ \dot{x}_r = C_9\eta + D_9\dot{x}_f \end{cases} \tag{8}$$

$$\text{Wherein } A_9=\begin{bmatrix} 0 & 1 \\ -\varphi_0 & -\varphi_1 \end{bmatrix}, B_9=\begin{bmatrix} -2\varphi_1 \\ 2\varphi_1^2 \end{bmatrix}, C_9=[1\ \ 0], D_9=1;$$

combining with equation (4) to obtain an active suspension state equation containing preview information, as shown in equation $$\begin{cases} \dot{X}_\eta = A_\eta X_\eta + B_{1\eta}\dot{x}_f + B_{2\eta}F \\ Y_\eta = C_{1\eta}X_\eta + D_{11\eta}\dot{x}_f + D_{12\eta}F \\ Z_\eta = C_{2\eta}X_\eta \end{cases} \quad (9)$$

$$\text{wherein } \dot{X}_\eta = \begin{bmatrix} \dot{X} \\ \dot{\eta} \end{bmatrix}, Y_\eta = \begin{bmatrix} Y \\ \dot{\eta} \end{bmatrix}, Z_\eta = \begin{bmatrix} Z \\ \dot{\eta} \end{bmatrix}, X_\eta = \begin{bmatrix} X \\ \dot{\eta} \end{bmatrix},$$

$$A_\eta = \begin{bmatrix} A & B_1 \square C_9 \\ 0 & A_9 \end{bmatrix}, B_{1\eta} = \begin{bmatrix} B_1 \square D_9 \\ B_9 \end{bmatrix}, B_{2\eta} = \begin{bmatrix} B_2 \\ 0 \end{bmatrix},$$

$$C_{1\eta} = \begin{bmatrix} C_1 & D_{11} \square C_9 \\ 0 & A_9 \end{bmatrix}, D_{11\eta} = \begin{bmatrix} D_{11} \square D_9 \\ B_9 \end{bmatrix}, D_{12\eta} = \begin{bmatrix} D_{12} \\ 0 \end{bmatrix},$$

$$C_{2\eta} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix};$$

secondly, designing an LMI-based suspension $H_\infty$ controller, a transfer function G from an external excitation to the output satisfies the following relationship:

$$\|G\| \le \gamma \quad (10)$$

wherein $\gamma$ is a specified positive scalar;

assuming that a state feedback gain is K, and substituting $F=KX_\eta$ into the equation (9) to obtain:

$$\begin{cases} \dot{X}_\eta = A_c X_\eta + B_{1\eta}\dot{x}_f \\ Y_\eta = C_l X_\eta + D_{11\eta}\dot{x}_f \\ Z_\eta = C_{2\eta}X_\eta \end{cases} \quad (11)$$

$$\text{wherein } A_C = A_\eta + B_{2\eta}\square K,\ C_l = C_{1\eta} + D_{12\eta}\square K;$$

theorem: for a given positive scalar $\gamma$, when there exists a positive definite matrix $P_0$ and a matrix Q, a following LMI is established:

$$\begin{bmatrix} P_0 A_\eta + Q^T B_{2\eta} + A_\eta P_0 + B_{2\eta} Q & P_0 C_{2\eta}^T & B_{2\eta} \\ C_{2\eta} P_0 & -I & 0 \\ B_{2\eta}^T & 0 & -\gamma^2 I \end{bmatrix} < 0 \quad (12)$$

then a closed-loop control system has the following $H_\infty$ performance:

$$\int_0^T Z^T(t)Z(t)dt < \lambda_{max}(P)\|X(0)\|^2 + \gamma^2 \int_0^T z_f^T(t)z_f(t)dt \quad (13)$$

$$\text{where } Q = KP_0,\ P_0 = P^{-1};$$

setting a Lyapunov function as $$V = X_\eta^T P X_\eta \quad (14)$$

taking a derivative of this to give:

$$\dot{V} = X_\eta^T (A_c^T P + PA_c) X_\eta + x_f^T B_{2\eta}^T P X_\eta + X_\eta^T P B_{2\eta} z_f \quad (15)$$

in order to ensure a performance of the $H_\infty$ controller, an evaluation index $J_1$ is introduced:

$$J_1 = \dot{V} + Z_\eta^T Z_\eta - \gamma^2 z_f^2 = [X_\eta \ z_f] \begin{bmatrix} A_c^T P + PA_c + C_{2\eta}^T C_{2\eta} & PB_{2\eta} \\ B_{2\eta}^T P & -\gamma^2 I \end{bmatrix} \begin{bmatrix} X_\eta \\ z_f \end{bmatrix} \quad (16)$$

according to Schur's complement theorem, the evaluation index $J_1$ can be equivalent to $J_2$, $$\begin{bmatrix} P^{-1} & 0 \\ 0 & I \end{bmatrix} \begin{bmatrix} A_c^T P + PA_c + C_{2\eta}^T C_{2\eta} & PB_{2\eta} \\ B_{2\eta}^T P & -\gamma^2 I \end{bmatrix} \begin{bmatrix} P^{-1} & 0 \\ 0 & I \end{bmatrix} \quad (17)$$

$$\text{that is } J_2 = \begin{bmatrix} p^{-1} A_c^T + A_c P^{-1} & B_{2\eta} & P^{-1} C_{2\eta}^T \\ B_{2\eta}^T & -\gamma^2 I & 0 \\ C_{2\eta} P^{-1} & 0 & -I \end{bmatrix} \quad (18)$$

substituting $A_c=A_n+B_{2\eta}\square K$ into the equation (18) and performing elementary transformations to give:

$$J_2 = \begin{bmatrix} p_0 A_\eta^T + Q^T B_{2\eta}^T + A_\eta P_0 + B_{2\eta} Q & P^{-1} C_{2\eta}^T & B_{2\eta} \\ C_{2\eta} P^0 & -I & 0 \\ B_{2\eta}^T & 0 & -\gamma^2 I \end{bmatrix} \quad (19)$$

given a positive scalar $\gamma$, when there exists a positive definite matrix $P_0$ and a matrix Q such that $J_2<0$, then $J_1<0$ holds, by integrating $J_1$, it gives:

$$\int_0^T J_1 dt = \int_0^T (\dot{V} + Z_\eta^T Z_\eta - \gamma^2 z_f^2) dt < 0 \quad (20)$$

according to Lyapunov's definition of stability, it gives:

$$\int_0^T \dot{V} dt = V(T) - V(0) < 0 \quad (21)$$

substituting the Lyapunov function into the equation (21), it gives:

$$\int_0^T \dot{V} dt = X_\eta^T(T) P X_\eta(T) - X_\eta^T(0) P X_\eta(0) < 0 \quad (22)$$

due to $$X_\eta^T(T) P X_\eta(T) > 0,\ P < -\lambda_{max}(P) I,$$

obtaining:

$$\int_0^T \dot{V}dt > -\lambda_{max}(P)\|X_\eta(0)\|^2 \tag{23}$$

then the equation (20) is equivalent to $$\int_0^T Z^T(t)Z(t)dt < \lambda_{max}(P)\|X(0)\|^2 + \gamma^2 \int_0^T z_f^T(t)z_f(t)dt \tag{24}$$

given a positive scalar γ, solving for the positive definite matrix $P_0$ and the matrix Q, a closed-loop system obtains a control gain of K=QP, then the closed-loop system has the $H_\infty$ performance;

using the LMI solver in MATLAB to solve the state feedback gain as K, and find an optimal control force, the designed preview $H_\infty$ controller is used to improve a suspension dynamic route, a tire dynamic displacement and a vehicle body acceleration, so that vehicle comfort and safety are improved.

* * * * *